(12) United States Patent
Seeger

(10) Patent No.: US 12,101,116 B2
(45) Date of Patent: *Sep. 24, 2024

(54) SYSTEM FOR CORRECTING PHASE NOISE AND/OR DRIFT OCCURRING IN OPTICAL FIBERS

(71) Applicant: Rohde & Schwarz GmbH & Co. KG, Munich (DE)

(72) Inventor: Julius Seeger, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 93 days.

This patent is subject to a terminal disclaimer.

(21) Appl. No.: 17/929,731

(22) Filed: Sep. 5, 2022

(65) Prior Publication Data
US 2024/0080096 A1  Mar. 7, 2024

(51) Int. Cl.
*H04B 10/071* (2013.01)
*H04B 10/2507* (2013.01)
*H04B 10/61* (2013.01)

(52) U.S. Cl.
CPC ....... *H04B 10/071* (2013.01); *H04B 10/2507* (2013.01); *H04B 10/614* (2013.01)

(58) Field of Classification Search
CPC .................................................. H04B 10/071
See application file for complete search history.

(56) References Cited

U.S. PATENT DOCUMENTS 9,019,019 B2   4/2015  Alouini et al.
10,742,324 B1* 8/2020  Padmaraju ........... H04B 10/541
11,575,436 B1* 2/2023  Seeger ............. H04B 10/25759
2016/0241341 A1* 8/2016  Endo ........................ H04J 14/02
2019/0265574 A1* 8/2019  Skirlo .................... G02F 1/3136
2020/0371212 A1* 11/2020 Rumala ................... G01S 17/42
2022/0263584 A1   8/2022  Hu et al.

FOREIGN PATENT DOCUMENTS

EP           0951112 A2   10/1999
WO        2021/120485 A1   6/2021

* cited by examiner

*Primary Examiner* — Shi K Li
(74) *Attorney, Agent, or Firm* — CHRISTENSEN O'CONNOR JOHNSON KINDNESS PLLC (57) ABSTRACT

A system for correcting phase noise and/or drift includes an optical signal module, at least one optical transport module, at least one sampling module, an analysis circuit, and a measurement instrument. The optical signal module is capable of outputting a modulated optical signal. The at least one optical signal transport module includes a beam splitter capable of separating at least backward travelling waves based on polarization. The at least one optical signal transport module further includes a partially reflecting reflector capable of creating a backward travelling wave, the partially reflecting reflector being located after the polarization rotator. The at least one sampling module is configured to receive and sample the backward travelling wave created by the partially reflecting reflector and forwarded to the at least one sampling module by the beam splitter, thereby obtaining an electric correction signal. The analysis circuit is configured to correct measurement data obtained by the measurement instrument based on the electric correction signal.

25 Claims, 4 Drawing Sheets

SYSTEM FOR CORRECTING PHASE NOISE AND/OR DRIFT OCCURRING IN OPTICAL FIBERS

FIELD OF THE DISCLOSURE

Embodiments of the present disclosure generally relate to a system for correcting phase noise and/or drift.

BACKGROUND

In the state of the art, radio frequency over fiber ("RFoF") networks are known that are used to transmit data at high speed over large distances, as optical transmission of high-frequency (HF) signals is beneficial due to its very low loss per distance. Therefore, those networks are typically used when HF signals have to be transmitted between different buildings or even over distances of several hundred meters. In general, RFoF networks provide high bandwidth, low-loss communication links, while delivering the radio frequency signals at the optimal wavelength.

However, it has turned out that optical fibers are very sensitive to temperature and pressure, wherein both have an impact on the refractive index and therefore the propagation delay of the signals transmitted. This leads to an increased phase noise. Accordingly, radio frequency over fiber networks may have a phase noise pickup under certain circumstances, which is disadvantageous.

In the state of the art, it is known to overcome the above-mentioned issue by using frequency modulation (FM) schemes to deduce dispersion effects. However, this requires additional frequency sources and additional signal paths such that the overall system is more complicated. Consequently, the known solutions are cost-intensive.

Accordingly, there is a need for a cost-efficient and reliable possibility to correct measurement data for phase noise and/or drift in a radio frequency over fiber network.

SUMMARY

Embodiments of the present disclosure provide a system for correcting phase noise and/or drift. In an embodiment, the system comprises an optical signal module, at least one optical transport module, at least one sampling module, an analysis circuit, and a measurement instrument. The optical signal module is capable of outputting a modulated optical signal. The at least one optical signal transport module is connected to the optical signal module. The at least one optical signal transport module comprises a beam splitter capable of separating at least backward travelling waves based on polarization. The at least one optical signal transport module further comprises at least one fiber connected to the beam splitter. The at least one optical signal transport module further comprises a polarization rotator capable of changing the polarization of the modulated optical signal. The at least one optical signal transport module further comprises a partially reflecting reflector capable of creating a backward travelling wave, the partially reflecting reflector being located after the polarization rotator.

In this embodiment, the at least one sampling module is connected to the optical signal transport module. The at least one sampling module is configured to receive and sample the backward travelling wave created by the partially reflecting reflector and forwarded to the at least one sampling module by the beam splitter, thereby obtaining an electric correction signal. The analysis circuit is configured to correct measurement data obtained by the measurement instrument based on the electric correction signal.

In general, the measurement instrument is sensitive to the phase of a high frequency signal transmitted to the measurement instrument via the at least one optical transport module. Accordingly, the system is enabled to correct the measurement data obtained by the measurement instrument based on the electric correction signal, which corresponds to the modulated optical signal that has travelled through the optical transport module twice, namely the backward travelling wave.

In some embodiments, the measurement data is corrected for the phase drift occurring in the at least one fiber based on the electric correction signal, which has been sampled based on the backward traveling wave.

The modulated optical signal originating from a source site, i.e., from the optical signal module, is at least partially, but preferably not fully reflected at a receiver site, namely by the partially reflecting reflector, wherein the reflected optical signal travels back to the source site along the same fiber. As such, no parallel running fibers are used. This reflected optical signal corresponds to the backward travelling wave that is created by the partially reflecting reflector. Since the partially reflecting reflector is located after the polarization rotator, it is ensured that the modulated optical signal to be reflected by the partially reflecting reflector has passed the polarization rotator prior to being reflected. Consequently, the backward travelling wave passes the polarization rotator afterwards again.

The polarization rotator may be located before the fiber, at the beginning of the fiber, within the fiber, at the end of the fiber or after the fiber. Hence, the polarization rotator may be provided at the source site (before the fiber), for example at the interface to the fiber (at the fiber tip). Further, the polarization rotator may also be provided at receiver site (after the fiber), for example at the interface to the fiber (at the fiber tip). Moreover, the polarization rotator may be provided within the fiber, for instance between two separate segments of the fiber.

It is only important that the partially reflecting reflector is arranged on the receiver site so that a potential phase shift of the fiber is taken into consideration.

In general, the fiber along which the respective signals travel is configured to maintain a polarization of the signals travelling along the fiber. Hence, no change of the polarization of the respective optical signals is introduced by the fiber itself such that it can be ensured that both the modulated optical signal and the reflected optical signal each have a defined polarization.

The backward travelling wave arriving at the beam splitter corresponds to a signal that passed the polarization rotator twice, namely for the first time when the modulated optical signal, e.g., the forward travelling wave, travels towards the receiver site and for the second time when the optical signal reflected by the partially reflecting reflector, e.g., the backward travelling wave, travels back along the fiber towards the source site.

The signals processed by the beam splitter can be distinguished from each other due to their respective polarizations. In some embodiments, the beam splitter is enabled to split only the backward travelling wave created by the partially reflecting reflector such that only this kind of backward travelling wave is forwarded to the sampling module for further processing. In some embodiments, this is ensured due to the polarization rotator of the system, which modifies the polarization in a defined manner.

In general, the beam splitter processes forward travelling waves as well as the backward travelling waves, for example the backward travelling waves created by the partially reflecting reflector.

In addition, the beam splitter is capable of distinguishing between backward travelling waves created at the source site, e.g., reflections at the interface between the source site and the fiber, and backward travelling waves created at the partially reflecting reflector, e.g., reflections at the partially reflecting reflector associated with the end of the fiber at receiver site. Thus, the beam splitter is enabled to distinguish between the different kinds of backward travelling waves that may occur, as the reflected signals at the beginning of the fiber may have never passed the polarization rotator and, therefore, the polarization of those signals is different to the polarization of the signals reflected at the partially reflecting reflector, as these signals have passed the polarization rotator twice. Accordingly, the beam splitter can distinguish between backward travelling waves originating from the receiver site, e.g., the ones reflected at the partially reflecting reflector, and those reflected at the source site (beginning of the fiber), e.g., at the interface of the source site to the fiber, i.e., at the fiber tip. Hence, the beam splitter is sensitive with regard to the polarization of the backward travelling waves so as to distinguish between their respective origins.

The beam splitter is further configured to only forward the backward travelling waves to the at least one sampling module that have been created by the partially reflecting reflector. As mentioned above, the respective signal associated with the backward travelling wave created by the partially reflecting reflector has traveled along the fiber twice and passed the polarization rotator twice. Any effects detected are doubled, as the respective backward travelling waves have passed the fiber twice.

Accordingly, an efficient system is provided for correcting the respective phase, as no additional frequency sources or rather signal paths are necessary. In some embodiments, the same fiber is used that forwards the signal from the source site to the receiver site for feeding the respective feedback loop provided at source site.

Generally, the setup of the system ensures to compensate all effects at the same time that have an influence on the phase of the signals processed by the optical fiber, namely temperature, pressure, bending, connectors and so on, as these conditions influence the refractive index.

Since the entire setup of the system is reduced with respect to the techniques known in the state of the art, the system may be at least partially chip-integrated, for example the sampling module.

Further, the components associated with the receiver site, namely the polarization rotator, the partially reflecting reflector and a receiver, e.g., a photodiode, may also be chip-integrated.

Generally, the fiber, for example the optical fiber, located between the source site and the receiver site establishes a fiber link between both sites.

For instance, the polarization rotator may be established by a lambda/4 wave plate. Generally, a wave plate is an optical device that alters the polarization state of a light wave travelling through it, e.g., converting linearly polarized light into circularly polarized light and vice versa.

The respective conversion of the polarization in the entire system can be described as follows. A horizontally linear polarization is changed to a circular polarization when the optical signal passes the polarization rotator, e.g., the lambda/4 rotator. Then, the optical signal is reflected by the partially reflecting reflector such that the polarization, e.g., the circular polarization is maintained. The reflected signal passes the polarization rotator again, e.g., the lambda/4 rotator, such that the circular polarization is changed to a vertically linear polarization.

Accordingly, the polarization (sensitive) beam splitter is enabled to distinguish between horizontally and vertically polarized waves so as to distinguish between the backward traveling waves reflected at source site and the ones reflected by the partially reflecting reflector at receiver site.

The partially reflecting reflector may be established by any surface, e.g. by a non-coated surface or a reflective surface.

It has turned out that the system according to the present disclosure is highly scalable, i.e., further optical signal transport modules and/or sampling modules can be added with comparatively low additional costs and effort.

Thus, the modulated optical signal can be provided to a plurality of locations simultaneously, e.g., to a plurality of measurement instruments and/or to a plurality of ports of a measurement instrument. Multiple measurements conducted by the plurality of measurement instruments and/or multiple measurements associated with the plurality of ports can be corrected individually based on electric correction signals provided for each measurement instrument and/or for each port.

According to an aspect of the present disclosure, the at least one optical signal transport module further comprises, for example, an optical receiver configured to convert the modulated optical signal into an electric reference signal, wherein the measurement instrument is configured to obtain the measurement data based on the electric reference signal. Accordingly, the electric reference signal is generated at the receiver site based on the modulated optical signal. Thus, the relevant (phase) information can be transmitted with low losses over large distances by the modulated optical signal, and the electric reference signal may be generated in the vicinity of the measurement instrument(s), thereby minimizing losses associated with the transport of high frequency electric signals.

In an embodiment of the present disclosure, the optical receiver is a photodiode. Thus, the photodiode converts the modulated optical signal received into the electrical reference signal for further processing.

According to another aspect of the present disclosure, the analysis circuit is configured, for example, to correct the measurement data based on the electric correction signal and based on phase data comprised in the measurement data. As the measurement instrument uses the electric reference signal for generating the measurement data, and the electric reference signal is generated based on the modulated optical signal that is subject to phase drift within the fiber, the phase data also comprises phase drift. Thus, the effects of this phase drift are reliably compensated by the system.

In general, the electric correction signal comprises information on the phase drift that occurs within the fiber, such that the measurement data, for example the phase data comprised in the measurement data, can reliably be corrected for the phase drift occurring within the fiber based on the electric correction signal.

In a further embodiment of the present disclosure, the analysis circuit is configured to correct the measurement data based on a relative phase between the electric correction signal and the phase data comprised in the measurement data. In other words, the difference between the phase data comprised in the measurement data and the phase of the electric correction signal may be determined, and the measurement data may be corrected based on the determined difference.

Another aspect of the present disclosure provides that the measurement instrument is a vector network analyzer with at least one external frontend, wherein the at least one external frontend is configured to receive the electric reference signal. The at least one external frontend may be provided in the vicinity of a corresponding port of a device under test to be measured in order to reduce electrical losses between the device under test and the frontend, such that high frequency (HF) measurements in the regime of several 10 GHz or even several 100 GHz can be reliably performed. Thus, the electric reference signal is provided directly to the external frontend(s) by the optical transport module(s).

Alternatively, the at least one frontend may be integrated into the measurement instrument.

The system may comprise a plurality of optical transport modules and a plurality of sampling modules, wherein the sampling modules are associated with one of the optical transport modules, respectively. As already mentioned above, the system is highly scalable, as the additional optical transport modules and the additional sampling modules can easily be provided at a relatively low cost.

For example, several (external) frontends may be provided, wherein each frontend receives an electric reference signal from the respectively associated optical transport module.

In a further embodiment of the present disclosure, the measurement instrument comprises a plurality of ports, wherein the optical transport modules are connected with one of the ports, respectively. Accordingly, measurement data associated with each of the ports may be corrected individually, as already described above.

The plurality of ports may be associated with a plurality of frontends of the measurement instrument.

Alternatively or additionally, the system comprises a plurality of measurement instruments, wherein each measurement instrument is connected with at least one of the optical transport modules. Accordingly, measurement data obtained by each measurement instrument may be corrected individually.

A further aspect of the present disclosure provides that the analysis circuit is configured, for example, to correct the measurement data based on a relative phase drift between the optical transport modules. In other words, phase drifts between two or more optical transport modules may be taken into account for correcting the measurement data associated with a plurality of ports and/or with a plurality of measurement instruments, for example if the measurement data comprises multi-port parameters, e.g. a S12 parameter.

According to an aspect of the present disclosure, the optical signal module comprises, for example, a light source and an electro-optical modulator, wherein the electro-optical modulator is configured to modulate light output by the light source, thereby obtaining the modulated optical signal.

The light source may be a (coherent) light source, e.g. laser (diode) or a light emitting diode (LED), that provides the optical signal to be processed.

The light source and the modulator may be established separate from each other.

In other words, the optical signal module may comprise an optical source, namely the light source, providing an optical signal and an electro-optical modulator having an input connected with the optical source. The electro-optical modulator receives via its input the optical signal provided by the optical source. The electro-optical modulator is capable of amplitude modulating the optical signal while being phase- and/or frequency-shifted, thereby generating the modulated optical signal. Accordingly, a dedicated electro-optical modulator is provided that is separately formed with respect to the optical source, e.g. a laser, a laser diode or a light emitting diode. The optical source outputs an optical signal that is forwarded to the electro-optical modulator which in turn modulates the optical signal received in order to generate the modulated optical signal that is forwarded to the receiver site via the fiber.

Alternatively, the light source and the modulator may be integrated into a common modulation device.

The common modulation device may be established by a (coherent) light source, e.g. a laser (diode), a light-emitting diode (LED), that is configured to modulate the optical signal directly in order to output the modulated optical signal. For instance, an operating current of the optical signal module, namely the (coherent) light source like the laser (diode), is altered, thereby generating the modulated optical signal. The operating current may be modulated by a local oscillator signal. This effectively results in the same modulation scheme as the one obtained due to the optical source and the electro-optical modulator which are separately formed.

In an embodiment of the present disclosure, the system comprises a local oscillator being configured to generate a local oscillator signal, wherein the modulator is configured to modulate the light output by the light source based on the local oscillator signal. In other words, information regarding the local oscillator signal, for example its frequency and/or its phase is transported from the source site to the receiver site by the modulated optical signal, such that power losses are greatly reduced compared to the electric transmission of high frequency signals.

In other words, the local oscillator signal generated by a local oscillator on the source site can be used as a reference signal by the measurement instrument on the receiver site for performing measurements.

Alternatively, a direct digital synthesizer (DDS) may be used for providing the local oscillator signal.

As mentioned above, the local oscillator signal may be generated by the direct digital synthesizer (DDS).

In a further embodiment of the present disclosure, the system comprises a bias circuit, wherein the bias circuit is configured to add a direct current (DC) bias to the local oscillator signal before the local oscillator signal is applied to the electro-optical modulator. In general, the DC bias can be used to shift the operating point of the electro-optical modulator in a predefined manner as to obtain the modulated optical signal having predefined properties.

For example, if the electro-optical modulator is established as a Mach-Zehnder modulator (MZM), then frequency doubling, tripling, etc. can happen if the working point is shifted in a predetermined manner. This characteristic of the MZM can be used in order to generate desired harmonics of the optical signal input into the MZM in an energy efficient manner, i.e. the modulated optical signal comprises harmonics of the (unmodulated) optical signal.

This way, the reference signal generated on the receiver site has an increased frequency, which corresponds to an increased time resolution for measurements performed by the measurement instrument.

The bias circuit may also be called "bias tee".

The DC bias may be configured such that an amplitude of a desired harmonic in the modulated optical signal is greater than a predefined threshold. In other words, the operation point of the electro-optical modulator is shifted such that the electro-optical modulator outputs the desired harmonic of the optical signal with at least the predefined threshold. Thus, it is ensured that the amplitude of the desired harmonic is large enough for further processing on the receiver site.

The bias circuit may be configured to stabilize the DC bias, e.g. by a reference diode.

Alternatively, a characteristic curve of the bias circuit may be recorded, and may be taken into account for correcting the measurement data, for example by the analysis circuit.

A further aspect of the present disclosure provides that the at least one optical signal transport module comprises, for example, a first filter configured to let a fundamental of the modulated optical signal or a desired harmonic in the modulated optical signal pass. Additionally or alternatively, the sampling module in some embodiments comprises a second filter configured to let a fundamental of the modulated optical signal or a desired harmonic in the modulated optical signal pass.

Accordingly, signals having different frequencies may be processed by the measurement instrument and by the at least one sampling module.

In some embodiments, the frequency of the reference signal processed by the measurement instrument is an integer multiple of the frequency of the signal processed by the at least one sampling module after the second filter.

It is noted that the fundamental and the harmonics experience essentially the same (relative) phase drift when passing through the fiber. Thus, the fundamental is sufficient for determining the electric correction signal, while the harmonics provide a higher time resolution for the measurements conducted by the measurement instrument.

However, harmonics may be used instead of the fundamental for determining the electric correction signal. For instance, the fundamental may have a frequency of about 10 GHz, while the desired harmonic may have a frequency of about 120 Ghz.

For example, the first filter and/or the second filter may be established as a bandpass filter, respectively, such that only those frequency portions, e.g. harmonics being of interest, are further processed by components downstream of the respective filter.

The bandpass filter(s) may be tunable or fixed.

As another example, the first filter and/or the second filter may correspond to a filter network, respectively, comprising bandpass filter(s), lowpass filter(s), highpass filter(s), frequency divider(s), frequency multiplier(s), or combinations thereof.

For example, the second filter may be arranged between the optical receiver and the mixer/phase detector, between the mixer/phase detector and the ADC, and/or between the ADC and the analysis circuit.

The first filter may be arranged between the optical receiver and the measurement instrument.

According to another aspect of the present disclosure, the fiber is configured, for example, to maintain the polarization of the modulated optical signal. Accordingly, the polarization is only changed by the polarization rotator, which allows the beam splitter to separate the backward travelling signal reflected at the partially reflecting reflector from signals reflected elsewhere in the optical transport module.

The system may comprise a local oscillator being configured to generate a local oscillator signal, wherein the local oscillator is connected with the at least one sampling module, and wherein the at least one sampling module is configured to obtain the electric correction signal based on the local oscillator signal. In some embodiments, the electric correction signal corresponds to or comprises information on a relative phase between the local oscillator signal and (the fundamental of) the backward travelling wave.

In an embodiment of the present disclosure, the at least one sampling module comprises a mixer being configured to obtain the electric correction signal based on the local oscillator signal, or wherein the at least one sampling module comprises a phase detector being configured to obtain the electric correction signal based on the local oscillator signal.

Alternatively, a direct digital synthesizer (DDS) may be used for providing the local oscillator signal.

In some embodiments, the electric correction signal is obtained by mixing the local oscillator signal with an electric signal corresponding to (the fundamental of) the backward travelling wave.

Alternatively, a phase detector may be provided that is configured to detect the phase of an electric signal corresponding to (the fundamental of) the backward travelling wave relative to the local oscillator signal.

In a further embodiment of the present disclosure, the at least one sampling module comprises an optical receiver configured to convert the backward travelling wave into an electric signal. Thus, the electric correction signal is obtained based on the electric signal corresponding to the backward travelling wave, i.e., the backward travelling wave converted into the electric signal by the optical receiver.

The optical receiver may be a photodiode. Thus, the photodiode converts the backward travelling wave received from the beam splitter into the electric signal for further processing by the sampling module.

A further aspect of the present disclosure provides that the at least one sampling module comprises, for example, an analog-to-digital converter (ADC). The ADC is configured to digitize the electric correction signal, thereby obtaining a sampled electric correction signal. The electric correction signal is forwarded to the analysis circuit for further processing, as described above.

In an embodiment of the present disclosure, the system comprises a divider circuit connected to the at least one sampling module downstream of the sampling module. The divider circuit is configured to divide the electric correction signal by two. As already mentioned above, the modulated optical signal travels through the fiber twice before being processed by the sampling module. Thus, the backward travelling wave processed by the sampling module in total has picked up double the phase drift of the reference signal used by the measurement instrument. The divider circuit compensates for this effect by dividing the electric correction signal by two.

Optionally, the divider circuit may comprise a sample-and-hold circuit, such that the electric correction signal and the measurement data may be obtained asynchronously, which is compensated by the sample-and-hold functionality.

Accordingly, the same value of the electric correction signal may be used to correct a plurality of measurement points of the phase data comprised in the measurement data.

Alternatively or additionally, the system may be configured to obtain the electric correction signal and the measurement data synchronously, such that there is a well-defined phase relation between the electric correction signal and the phase data comprised in the measurement data.

An aspect provides that a single signal line in the at least one signal transport module is provided, for example, between the beam splitter and the partially reflecting reflector, wherein the single signal line is established by the fiber. Therefore, a very compact setup is provided by the system.

Thus, the at least one sampling circuit can be integrated on a single chip. In other words, no separate feedback line, for example a parallel line structure, is required, which in turn reduces the costs and the overall complexity of the system. Therefore, the system can be used in harsh environments effectively. However, this does not exclude that the fiber comprises more than one segment wherein the segments are connected in a serial manner to each other.

Generally, the system can be used for distribution of the local oscillator signal in the GHz regime with almost no transmission loss due to the optical fiber used for transmitting the (modulated) optical signal that has been modulated based on the local oscillator signal received from the local oscillator or from the direct digital synthesizer.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Similarly, any steps described herein may be interchangeable with other steps, or combinations of steps, in order to achieve the same or substantially similar result. Moreover, some of the method steps can be carried serially or in parallel, or in any order unless specifically expressed or understood in the context of other method steps.

Figure 1:
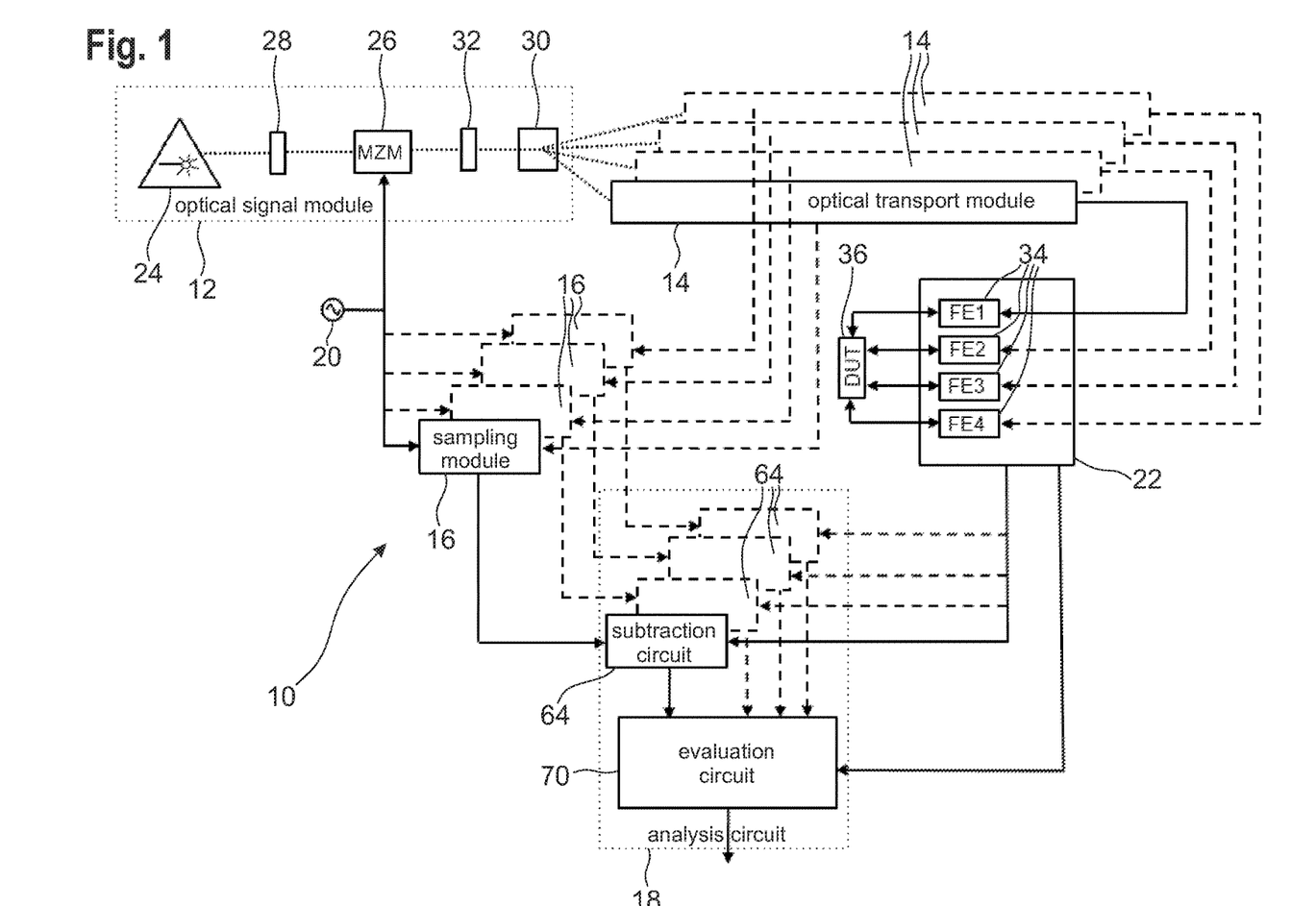
FIG. 1 schematically shows a system for correcting phase noise and/or drift according to an embodiment of the present disclosure.

FIG. 1 schematically shows a system 10 for correcting phase noise and/or drift, which may, for example, occur in optical fibers of a radio frequency over fiber ("RFoF") network. In the embodiment shown, the system 10 comprises an optical signal module 12, a plurality of optical transport modules 14, a plurality of sampling modules 16, an analysis circuit 18, a local oscillator 20, and a measurement instrument 22.

In the following, it is assumed without restriction of generality that the system 10 comprises at least two optical transport modules 14 and at least two sampling modules 16, for example four or eight, respectively. However, in some embodiments, the system 10 may also comprise only a single optical transport module 14 and/or only a single sampling module 16, for example.

In general, the optical signal module 12 is configured to output a modulated optical signal, and to forward the modulated optical signal to the optical transport modules 14. In some embodiments, the optical signal module 12 is capable of amplitude modulating an optical signal while being phase- and/or frequency-shifted, thereby outputting the modulated optical signal.

The optical signal module 12 comprises a light source 24, which may be established by a laser in the shown embodiment. In the embodiment shown, the optical signal module 12 further comprises an electro-optical modulator 26 that is configured to receive light output by the light source 24 as well as an electric local oscillator signal generated by the local oscillator 20.

The electro-optical modulator 26 is configured to modulate the light output by the light source 24 based on the local oscillator signal received from the local oscillator 20. In an embodiment, the electro-optical modulator 26 may be established by a Mach-Zehnder modulator (MZM). In some embodiments, the electro-optical modulator 26 may be driven with a bias voltage to maximize the nonlinearity of a transfer function as to create harmonics, as will be described in more detail below.

Further, a polarization control 28 is located between the light source 24 and the electro-optical modulator 26, thereby ensuring that the electro-optical modulator 26 receives an optical signal having a defined polarization. For instance, the polarization control 28 may be established by a wave plate, for instance a lambda/2 wave plate.

In the embodiment shown, the optical signal module 12 further comprises a beam distributor 30 that is provided downstream of the electro-optical modulator 26. The beam distributor 30 is connected to the electro-optical modulator 26, so as to receive the amplitude-modulated optical signal that is outputted by the electro-optical modulator 26. The beam distributor 30 is configured to split the amplitude-modulated optical signal, such that the amplitude-modulated optical signal is forwarded to the optical transport modules 14, for example to each of the optical transport modules 14.

In the shown embodiment, another polarization control 32 is provided between the electro-optical modulator 26 and the beam distributor 30, which may be used to ensure that no polarization effects introduced by the optical signal module 12, for example the electro-optical modulator 26, have an impact on the further processing. Alternatively, only one of both polarization controls 28, 32 or even none of the polarization controls 28, 32 is provided in some embodiments.

In general, the optical transport module 14 is configured to transport the amplitude-modulated optical signal to the measurement instrument 22, wherein the amplitude-modulated optical signal is converted into an electric reference signal in the vicinity of the measurement instrument 22, as will be described in more detail below.

The measurement instrument 22 may, e.g., be established as a vector network analyzer with at least one external frontend 34. In some embodiments, the measurement instrument 22 may comprise a plurality of frontends 34 (labelled with "FE1" to "FE4" in FIG. 1), wherein each of the frontends 34 is connected with one of the optical transport modules 14, respectively. Accordingly, each of the frontends 34 receives an electrical signal corresponding to the amplitude-modulated optical signal via one of the optical transport modules 14, respectively.

It is noted that while the frontends 34 are illustrated to be integrated into the measurement instrument 22, the frontends 34 may alternatively be established as external frontends, i.e. as frontends that are established separately from the measurement instrument 22.

In the embodiment shown in FIG. 1, the frontends 34 are further connected with a device under test 36. The frontends 34 receive signals from the device under test 36, and the frontends 34 generate measurement signals based on the signals received from the device under test 36 and based on the reference signals received via the optical transport modules.

The measurement instrument 22 is configured to generate measurement data based on the measurement signals provided by the frontends 34. The measurement data may comprise a measured phase, i.e. phase data, for example phases of S parameters associated with the device under test 36. The measurement data generated by the measurement instrument 22 is forwarded to the analysis circuit 18.

In general, the analysis circuit 18 is configured to correct the measurement data obtained by the measurement instrument 22 based on an electric correction signal received from the sampling modules 16, which will be described in more detail hereinafter.

Figure 2:
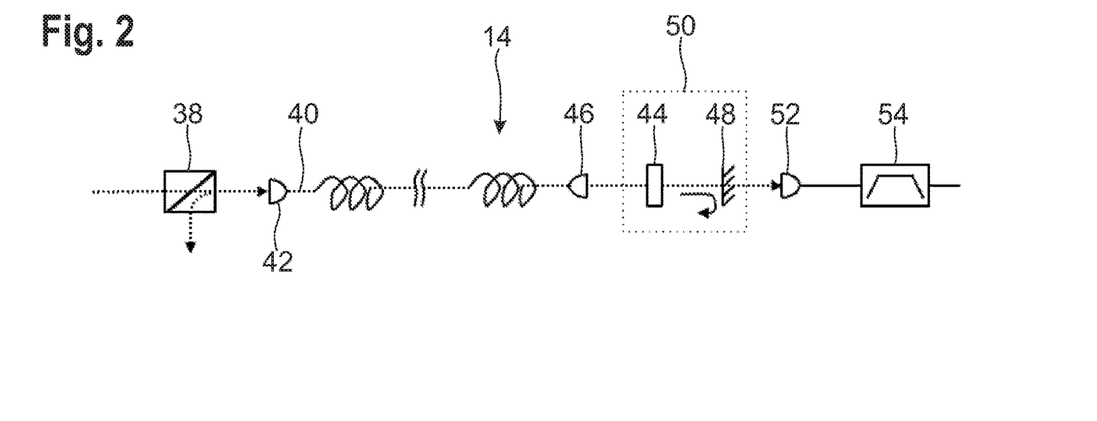
FIG. 2 schematically shows an example of an optical transport module of the system of FIG. 1.

FIG. 2 schematically shows an example of one of the optical transport modules 14 in more detail. While it is, in principle, possible that the optical transport modules 14 are configured different from each other, it is assumed in the following that all optical transport modules 14 are configured functionally identical.

In the embodiment of FIG. 2, the shown optical transport module 14 comprises a beam splitter 38 that is established as, for example, a polarization beam splitter (PBS). The beam splitter 38 is connected to the optical signal module 12, for example, to the beam distributor 30, so as to receive the amplitude-modulated optical signal that is outputted by the optical signal module 12, for example by the electro-optical modulator 26.

The beam splitter 38 is generally capable of separating forward travelling waves, namely waves travelling in the first direction, and backward travelling waves, namely waves travelling in the opposite direction, based on polarization. Accordingly, the beam splitter 38 separates backward travelling waves based on their respective polarization such that only those backward travelling waves are split off for further processing that have a certain polarization.

The beam splitter 38 is further connected with one of the sampling circuits 16, such that the sampling circuit 16 receives the respective signal split by the beam splitter 38, namely the backward travelling waves having the certain polarization.

In the embodiment shown, the optical transport module 14 comprises an optical fiber 40 that is connected with the beam splitter 38 downstream of the beam splitter 38 via an interface 42 that may have an anti-reflection coating. The fiber 40 generally maintains the respective polarization of the optical signal that travels along the fiber 40 from the optical signal module 12 to the measurement instrument 22.

The respective optical signal travelling along the fiber from the optical signal module 12 to the measurement instrument 22 passes a polarization rotator 44 that may be established by a wave plate, for instance a lambda/4 wave plate. Hence, the polarization of the optical signal passing the polarization rotator 44 is changed in a defined manner. In other words, the polarization rotator 44 is capable of changing the polarization of the optical signal that passes the polarization rotator 44. For example, if the (modulated) optical signal has a linear polarization of 0° before the polarization rotator 44, the (modulated) optical signal is circular polarized after a single pass of the polarization rotator 44.

In the embodiment shown in FIG. 2, the polarization rotator 44 is located after the fiber 40, namely after an interface 46 between the fiber 40 and the measurement instrument 22. However, the polarization rotator 44 may also be located directly at the end of the fiber 40, namely as part of the interface 46, or within the fiber 40, e.g., in front of the interface 46. In general, the polarization rotator 44 could also be arranged before the fiber at the tip of the fiber 40, namely at the interface 42.

Further, the optical transport module 14 comprises a partially reflecting reflector 48 that may be established by a partially reflecting surface. For instance, the partially reflecting reflector 48 may be a mirror that partially reflects the optical signal impinging thereon.

The polarization rotator 44 and the partially reflecting reflector 48 may be separately formed components or may alternatively be established by a single device 50 as indicated by the box with dotted lines. For instance, the single device 50 may be a Faraday mirror, e.g. an arrangement of a Faraday rotator with a mirror located after the Faraday rotator.

Therefore, the partially reflecting reflector 48 creates a backward travelling wave that travels from the partially reflecting reflector 48 towards the beam splitter 38. In the embodiment shown in FIG. 2, the partially reflecting reflector 48 is located after the fiber 40. However, the partially reflecting reflector 48 can also be located at the end of the fiber 40, namely as part of the interface 46. In any case, the partially reflecting reflector 48 is located after the polarization rotator 44 in terms of the travelling direction of the optical signal originating from the light source 24.

The backward travelling wave created by the partially reflecting reflector 48 travels along the fiber 40 from the partially reflecting reflector 48 towards the beam splitter 38 as mentioned above, thereby passing again the polarization rotator 44 such that the polarization of the reflected optical signal, namely the backward travelling wave, is manipulated again in a defined manner.

In case that the polarization rotator 44 is a lambda/4 wave plate, passing the wave plate once forward and once backwards (so all in all a "double pass") gives a phase shift of 90°. Accordingly, if the incoming light is linear polarized in vertical direction the backwards travelling wave after the "double pass" is polarized linearly in horizontal direction.

Then, the backward travelling wave has the certain polarization that is used by the beam splitter 38. The backward travelling wave travels along the (same) fiber 40 towards the beam splitter 38 that processes the backward travelling wave accordingly. As mentioned above, the backward travelling wave that reaches the beam splitter 38 has passed the polarization rotator 44 twice and travelled along the fiber 40 twice.

The polarization of the backward travelling wave has a defined polarization that matches with the one of the beam splitter 38 used for splitting. Hence, the beam splitter 38 is enabled to separate the backward travelling wave created by the partially reflecting reflector 48.

Put differently, the beam splitter 38 is enabled to distinguish between a backward travelling wave created by the partially reflecting reflector 48 and a backward travelling wave reflected at other components, for instance at the interface 42, due to the respective polarizations of these backward travelling waves, as only the backward travelling wave reflected at the partially reflecting reflector 48 has passed the polarization rotator 44 twice, thereby having the dedicated polarization that matches with the one used by the beam splitter 38 for splitting.

The beam splitter 38 splits the respective backward travelling wave received from the partially reflecting reflector 48 such that it is inputted into the sampling module 16 associated or connected with the respective optical transport module.

In the embodiment shown, the optical transport module 14 further comprises a receiver 52 that is established by a photodiode. The receiver 52 decodes the optical signal received so as to obtain the data transmitted, e.g. the local oscillator signal. The receiver 52 may be located in the vicinity of the measurement instrument 22, for example in the vicinity of the associated (external) frontend 34, in order to keep electric losses at a minimum.

In addition, the optical transport module 14 may comprise a (bandpass) filter 54 that is provided after the receiver 52, such that only those frequency portions, e.g. harmonics being of interest are further processed by the measurement instrument 22 or the associated (external) frontend 34.

Figure 3:
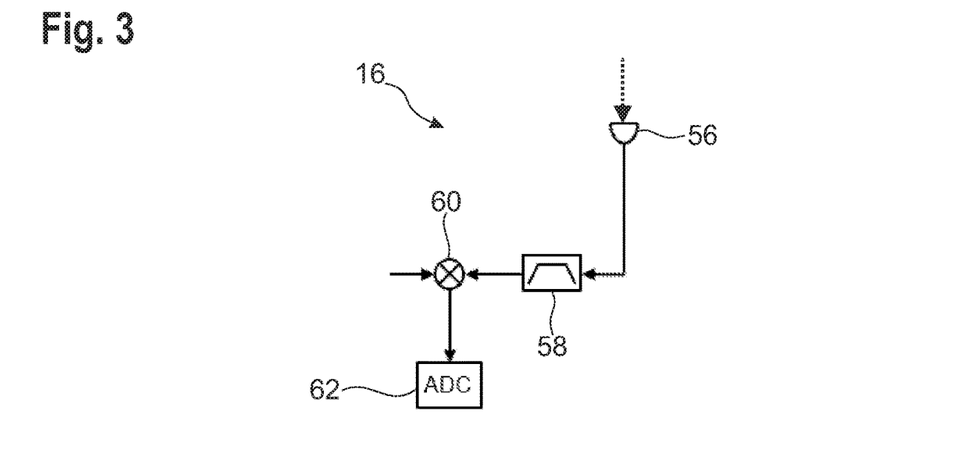
FIG. 3 schematically shows an example of a sampling module of the system of FIG. 1.

FIG. 3 schematically shows one example of a sampling module 16 in more detail. In the embodiment shown in FIG. 3, the sampling module 16 comprises a receiver 56 that is connected with the beam splitter 38 of the associated optical transport module 14. The receiver 56 may be, for example, established as a photodiode. Hence, the receiver 56 receives the backward travelling wave, namely the corresponding optical signal, and converts the respective optical signal into an electric signal for further processing. The sampling module 16 further comprises, for example, a (bandpass) filter 58 downstream of the receiver 56, such that only desired frequency portions are further processed by the sampling module 16.

In general, the passbands of the (bandpass) filter 54 of the optical transport module 14 and of the (bandpass) filter 58 of the sampling module 16 may be equal or different from each other. For example, the (bandpass) filter 54 of the optical transport module 14 may be configured to let predefined harmonics of the modulated optical signal pass, while the (bandpass) filter 58 of the sampling module 16 may be configured to let a fundamental of the modulated optical signal pass.

The sampling module 16 may further comprise a mixer 60 that is provided downstream of the (bandpass) filter 58. The mixer 60 is connected with the (bandpass) filter 58 and with the local oscillator 20. The mixer 60 is configured to mix the electric signal that is filtered by the (bandpass) filter 58 with the local oscillator signal received from the local oscillator 20, thereby obtaining an electric correction signal that is sampled by an analog-to-digital converter 62 provided downstream of the mixer 60.

The mixer 60 may be established as a phase detector, i.e., the mixer 60 may be configured to detect a phase difference between the local oscillator signal and the electric signal filtered by the (bandpass) filter 58. The mixer 60 may be an analog phase detector or a digital phase detector. Any analog or digital circuitry suitable configured may be used to implement the functionality of the mixer.

The sampled electric correction signal is forwarded to the analysis circuit 18. As already described above, the analysis circuit 18 is configured (e.g., programmed, etc.) to correct the measurement data obtained by the measurement instrument 22 based on the electric correction signals received from the sampling modules 16, or more precisely from the analog-to-digital converters 62 of the sampling modules 16.

In the embodiment shown in FIG. 1, the analysis circuit 18 comprises a plurality of subtraction circuits 64, wherein each subtraction circuit 64 is connected with one of the sampling modules 16, respectively, such that the subtraction circuits 64 receive the sampled electric correction signals from the connected sampling modules 16.

Figure 4:
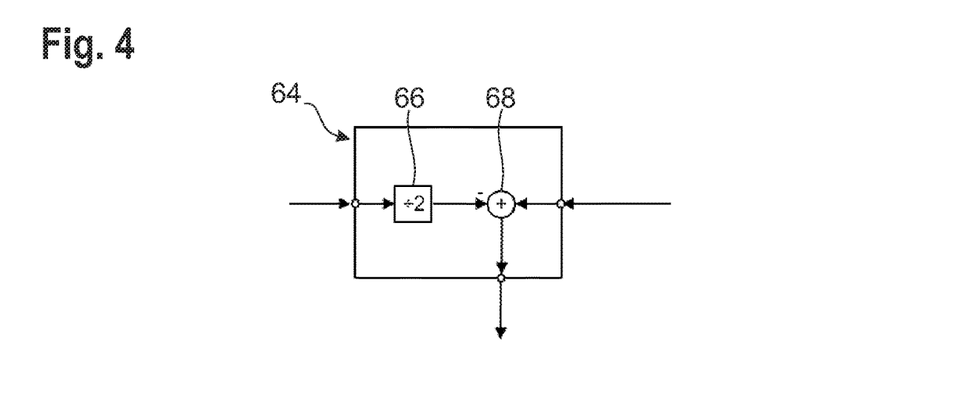
FIG. 4 schematically shows an example of a subtraction circuit of the system of FIG. 1.

FIG. 4 shows one example of the subtraction circuits 64 in more detail. As shown in FIG. 4, the subtraction circuit 64 comprises a divider circuit 66 that is connected to the associated sampling module 16 downstream of the sampling module 16. The divider circuit 66 is configured to divide the (digitized) electric correction signal by two.

As already mentioned above, the modulated optical signal travels through the fiber twice before being processed by the sampling module 16. Thus, the backward travelling wave processed by the sampling module 16 in total has picked up double the phase drift of the reference signal used by the measurement instrument 22. The divider circuit 66 compensates for this effect by dividing the electric correction signal by two.

The subtraction circuit 64 further comprises a subtraction unit 68, wherein the subtraction unit 68 is configured to subtract the electric correction signal from the measurement data obtained by the measurement instrument 22, for example from the measured phases, i.e. the phase data comprised in the measurement data, thereby obtaining corrected phase data.

The analysis circuit 18 further comprises an evaluation circuit 70 that is connected to the subtraction units 68 downstream of the subtraction units 68. The evaluation circuit 70 may be established as an integrated circuit that is configured to perform the functionalities described hereinafter. Alternatively, the evaluation circuit 70 may be established by a separately formed device, such as a measurement instrument, a computer, etc.

The evaluation circuit 70 is configured to correct the measurement data obtained by the measurement instrument 22 based on the corrected phase data received from the subtraction units 68. In some embodiments, the measurement data obtained via each of the (external) frontends 34 may be (individually) corrected by the evaluation circuit 70 based on the respectively associated corrected phase data.

In the following, different embodiments of the system 10 and of its different components and modules are described. It is to be understood that these embodiments may be arbitrarily combined with each other.

Figure 5:
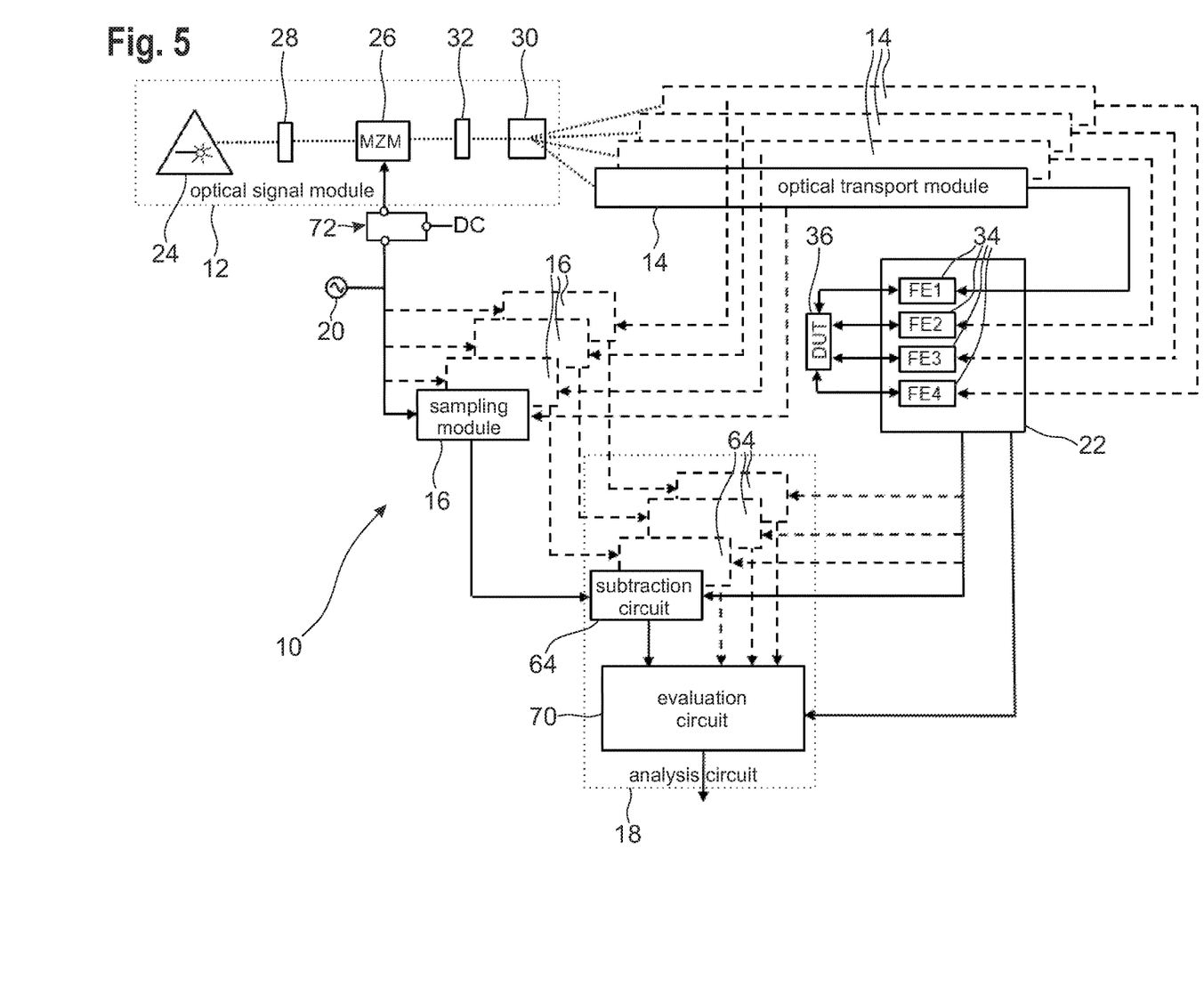
FIG. 5 schematically shows another embodiment of a system for correcting phase noise and/or drift according to the present disclosure.

FIG. 5 shows another embodiment of the system 10, wherein only the differences compared to the embodiment of FIG. 1 described above will be discussed in the following. It is to be understood that the explanations given above with respect to the first embodiment likewise apply to the second embodiment of the system 10 described in the following.

In the embodiment of FIG. 5, the system 10 further comprises a bias circuit 72 that is interconnected between the local oscillator 20 and the electro-optical modulator 26. In general, the bias circuit is configured to add a voltage, namely a direct current (DC) bias to the local oscillator signal before the local oscillator signal is applied to the electro-optical modulator 26.

Therein, the DC bias is configured such that an amplitude of a desired harmonic in the modulated optical signal is greater than a predefined threshold. In other words, nonlinear behavior of the electro-optical modulator 26 with respect to the input voltage is used in order to generate desired harmonics in the modulated optical signal.

In some embodiments, the (bandpass) filters 54 of the optical transport modules 14 may be configured to let the desired harmonics pass, such that a reference signal of higher frequency is provided to the measurement instrument 22. The (bandpass) filters 58 of the sampling modules 16 may be configured to let the fundamental of the modulated optical signal pass.

Figure 6:
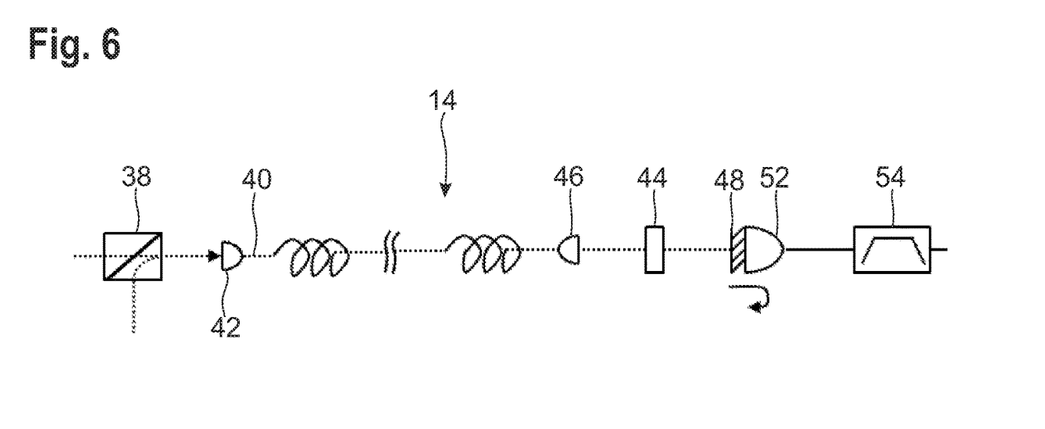
FIG. 6 schematically shows another example of an optical transport module of the system of FIG. 1 or 5.
Figure 7:
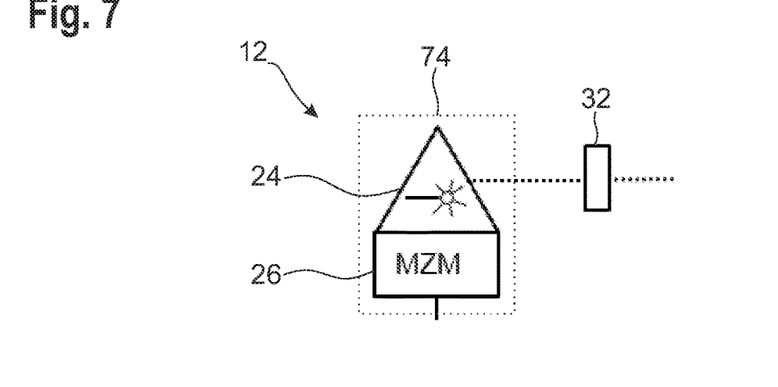
FIG. 7 schematically shows another example of a sampling module of the system of FIG. 1 or 5.

FIG. 6 shows another embodiment of the optical transport modules 14. Compared to the embodiment described above in FIG. 2, the partially reflecting reflector 48 and the receiver 52 are established as a single device, i.e., the partially reflecting reflector 48 may be integrated into the receiver 52. For example, the receiver 52 may be a photodiode that is coated with the partially reflecting reflector 48.

FIG. 6 shows another embodiment of the optical signal module 12 up to the polarization control 32. The beam distributor 30 is not shown, but may of course be present. In the shown embodiment of the optical signal module 12, the light source and the electro-optical modulator 26 are integrated into a common modulation device 74. For example, the modulation device 74 or the electro-optical modulator 26 may be configured to modulate the power supplied to the light source 24 based on the local oscillator signal, such that the light source outputs the amplitude modulated optical signal directly.

Figure 8:
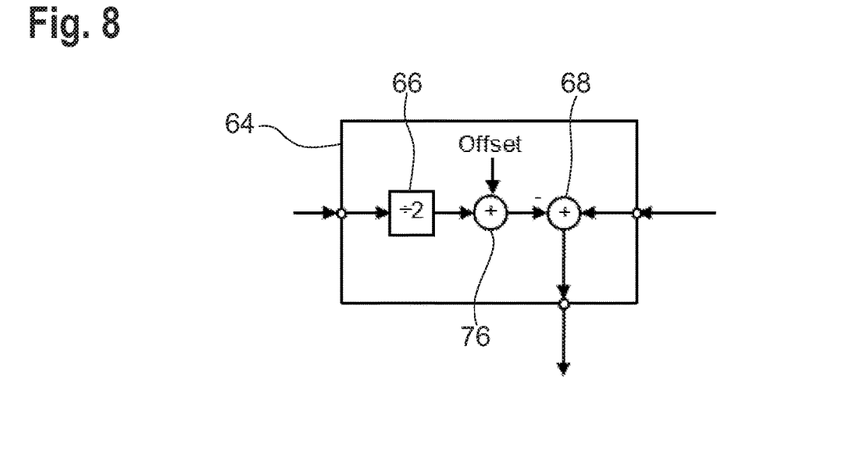
FIG. 8 schematically shows another embodiment of a subtraction circuit of the system FIG. 1 or 5.

FIG. 8 shows another embodiment of the subtraction circuit 64. In this embodiment, the subtraction circuit 64 further comprises an offset unit 76 that may be provided upstream or downstream of the divider circuit 66. The offset unit 76 is configured to add a phase offset to the electric correction signal, such that differences in a processing time between the receivers 52, 56 are compensated, namely differences in the time needed by the individual receivers 52, 56 to convert the respective optical signal into a corresponding electric signal.

Certain embodiments disclosed herein utilize circuitry (e.g., one or more circuits) in order to implement protocols, methodologies or technologies disclosed herein, operably couple two or more components, generate information, process information, analyze information, generate signals, encode/decode signals, convert signals, transmit and/or receive signals, control other devices, etc. Circuitry of any type can be used. It will be appreciated that the term "information" can be use synonymously with the term "signals" in this paragraph. It will be further appreciated that the terms "circuitry," "circuit," "one or more circuits," etc., can be used synonymously herein.

In an embodiment, circuitry includes, among other things, one or more computing devices such as a processor (e.g., a microprocessor), a central processing unit (CPU), a digital signal processor (DSP), an application-specific integrated circuit (ASIC), a field programmable gate array (FPGA), a system on a chip (SoC), or the like, or any combinations thereof, and can include discrete digital or analog circuit elements or electronics, or combinations thereof.

In an embodiment, circuitry includes hardware circuit implementations (e.g., implementations in analog circuitry, implementations in digital circuitry, and the like, and combinations thereof). In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes one or more processors or portions thereof and accompanying software, firmware, hardware, and the like.

In some examples, the functionality described of the analysis circuit 18 can be implemented by special purpose hardware-based computer systems or circuits, etc., or combinations of special purpose hardware and computer instructions. Each of these special purpose hardware-based computer systems or circuits, etc., or combinations of special purpose hardware circuits and computer instructions form specifically configured circuits, machines, apparatus, devices, etc., capable of implemented the functionality described herein.

Of course, in some embodiments, two or more components, or parts thereof, can be integrated or share hardware and/or software, circuitry, etc. In some embodiments, these components, or parts thereof, may be grouped in a single location or distributed over a wide area. In circumstances where the components are distributed, the components are accessible to each other via communication links.

In the foregoing description, specific details are set forth to provide a thorough understanding of representative embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

The present application may reference quantities and numbers. Unless specifically stated, such quantities and numbers are not to be considered restrictive, but exemplary of the possible quantities or numbers associated with the present application. Also, in this regard, the present application may use the term "plurality" to reference a quantity or number. In this regard, the term "plurality" is meant to be any number that is more than one, for example, two, three, four, five, etc. The term "about," "approximately," etc., means plus or minus 5% of the stated value.

Throughout this specification, terms of art may be used. These terms are to take on their ordinary meaning in the art from which they come, unless specifically defined herein or the context of their use would clearly suggest otherwise.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A system for correcting phase noise and/or drift, comprising:
    an optical signal module, at least one optical transport module, at least one sampling module, an analysis circuit, and a measurement instrument,
    wherein the optical signal module is capable of outputting a modulated optical signal,
    wherein the at least one optical signal transport module is connected to the optical signal module, the at least one optical signal transport module comprising a beam splitter, the beam splitter being capable of separating at least backward travelling waves based on polarization,
    wherein the at least one optical signal transport module further comprises at least one fiber connected to the beam splitter,
    wherein the at least one optical signal transport module further comprises a polarization rotator capable of changing the polarization of the modulated optical signal,
    wherein the at least one optical signal transport module further comprises a partially reflecting reflector capable of creating a backward travelling wave, the partially reflecting reflector being located after the polarization rotator,
    wherein the at least one sampling module is connected to the optical signal transport module, the at least one sampling module being configured to receive and sample the backward travelling wave created by the partially reflecting reflector and forwarded to the at least one sampling module by the beam splitter, thereby obtaining an electric correction signal,
    wherein the analysis circuit is configured to correct measurement data obtained by the measurement instrument based on the electric correction signal,
    wherein the at least one optical signal transport module further comprises an optical receiver, wherein the optical receiver is configured to convert the modulated optical signal into an electric reference signal, wherein the measurement instrument is configured to obtain the measurement data based on the electric reference signal, and
    wherein the measurement instrument is a vector network analyzer with at least one external frontend, wherein the at least one external frontend is configured to receive the electric reference signal.

2. The system of claim 1, wherein the optical receiver is a photodiode.

3. The system of claim 1, wherein the analysis circuit is configured to correct the measurement data based on the electric correction signal and based on phase data comprised in the measurement data.

4. The system of claim 1, wherein the system comprises a plurality of optical transport modules and a plurality of sampling modules, wherein the sampling modules are associated with one of the optical transport modules, respectively.

5. The system of claim 4, wherein the measurement instrument comprises a plurality of ports, wherein the optical transport modules are connected with one of the ports, respectively.

6. The system of claim 4, wherein the system comprises a plurality of measurement instruments, wherein each measurement instrument is connected with at least one of the optical transport modules.

7. The system of claim 4, wherein the analysis circuit is configured to correct the measurement data based on a relative phase drift between the optical transport modules.

8. The system of claim 1, wherein the optical signal modulator comprises a light source and an electro-optical modulator, wherein the electro-optical modulator is configured to modulate light output by the light source, thereby obtaining the modulated optical signal.

9. The system of claim 8, wherein the light source and the electro-optical modulator are integrated into a common modulation device, or wherein the light source and the electro-optical modulator are established separate from each other.

10. The system of claim 8, wherein the system comprises a local oscillator being configured to generate a local oscillator signal, wherein the electro-optical modulator is configured to modulate the light output by the light source based on the local oscillator signal.

11. The system of claim 10, wherein the system comprises a bias circuit, wherein the bias circuit is configured to add a direct current (DC) bias to the local oscillator signal before the local oscillator signal is applied to the electro-optical modulator.

12. The system of claim 11, wherein the DC bias is configured such that an amplitude of a desired harmonic in the modulated optical signal is greater than a predefined threshold.

13. The system of claim 1, wherein the at least one optical signal transport module comprises a first filter, wherein the first filter is configured to let a fundamental of the modulated optical signal or a desired harmonic in the modulated optical signal pass, and/or wherein the sampling module comprises a second filter, wherein the second filter is configured to let a fundamental of the modulated optical signal or a desired harmonic in the modulated optical signal pass.

14. The system of claim 1, wherein the fiber is configured to maintain the polarization of the modulated optical signal.

15. The system of claim 1, wherein the system comprises a local oscillator being configured to generate a local oscillator signal, wherein the local oscillator is connected with the at least one sampling module, and wherein the at least one sampling module is configured to obtain the electric correction signal based on the local oscillator signal.

16. The system of claim 15, wherein the at least one sampling module comprises a mixer being configured to obtain the electric correction signal based on the local oscillator signal, or wherein the at least one sampling module comprises a phase detector being configured to obtain the electric correction signal based on the local oscillator signal.

17. The system of claim 1, wherein the at least one sampling module comprises an optical receiver, wherein the optical receiver is configured to convert the backward travelling wave into an electric signal.

18. The system of claim 1, wherein the at least one sampling module comprises an analog-to-digital converter.

19. The system of claim 1, further comprising a divider circuit, wherein the divider circuit is connected to the at least one sampling module downstream of the at least one sampling module, and wherein the divider circuit is configured to divide the electric correction signal by two.

20. A system for correcting phase noise and/or drift, comprising:
    a measurement instrument;
    an optical signal module capable of outputting a modulated optical signal;
    at least one optical signal transport module connected to the optical signal module, the at least one optical signal transport module comprising a beam splitter and at least one fiber connected to the beam splitter, the beam splitter being capable of separating at least backward travelling waves based on polarization, wherein the at least one optical signal transport module further comprises a polarization rotator capable of changing the polarization of the modulated optical signal, and wherein the at least one optical signal transport module further comprises a partially reflecting reflector capable of creating a backward travelling wave, the partially reflecting reflector being located after the polarization rotator;
    at least one sampling module connected to the optical signal transport module, the at least one sampling module being configured to receive and sample the backward travelling wave created by the partially reflecting reflector and forwarded to the at least one sampling module by the beam splitter, thereby obtaining an electric correction signal; and
    an analysis circuit configured to correct measurement data obtained by the measurement instrument based on the electric correction signal,
    wherein the system comprises a plurality of optical transport modules and a plurality of sampling modules, wherein the sampling modules are associated with one of the optical transport modules, respectively.

21. The system of claim 20, wherein the measurement instrument comprises a plurality of ports, wherein the optical transport modules are connected with one of the ports, respectively.

22. The system of claim 20, wherein the system comprises a plurality of measurement instruments, wherein each measurement instrument is connected with at least one of the optical transport modules.

23. The system of claim 20, wherein the analysis circuit is configured to correct the measurement data based on a relative phase drift between the optical transport modules.

24. A system for correcting phase noise and/or drift, comprising:
    a measurement instrument;
    an optical signal module capable of outputting a modulated optical signal;
    at least one optical signal transport module connected to the optical signal module, the at least one optical signal transport module comprising a beam splitter and at least one fiber connected to the beam splitter, the beam splitter being capable of separating at least backward travelling waves based on polarization, wherein the at least one optical signal transport module further comprises a polarization rotator capable of changing the polarization of the modulated optical signal, and wherein the at least one optical signal transport module further comprises a partially reflecting reflector capable of creating a backward travelling wave, the partially reflecting reflector being located after the polarization rotator;
    at least one sampling module connected to the optical signal transport module, the at least one sampling module being configured to receive and sample the backward travelling wave created by the partially reflecting reflector and forwarded to the at least one sampling module by the beam splitter, thereby obtaining an electric correction signal, wherein the electric correction signal comprises information on a phase drift occurring in the at least one fiber; and
    an analysis circuit configured to correct measurement data obtained by the measurement instrument for the phase drift occurring in the at least one fiber based on the electric correction signal.

25. A system for correcting phase noise and/or drift, comprising:
    a measurement instrument;
    an optical signal module capable of outputting a modulated optical signal;
    at least one optical signal transport module connected to the optical signal module, the at least one optical signal transport module comprising a beam splitter and at least one fiber connected to the beam splitter, the beam splitter being capable of separating at least backward travelling waves based on polarization, wherein the at least one optical signal transport module further comprises a polarization rotator capable of changing the polarization of the modulated optical signal, wherein the at least one optical signal transport module further comprises a partially reflecting reflector capable of creating a backward travelling wave, the partially reflecting reflector being located after the polarization rotator;
    at least one sampling module connected to the optical signal transport module, the at least one sampling module being configured to receive and sample the backward travelling wave created by the partially reflecting reflector and forwarded to the at least one sampling module by the beam splitter, thereby obtaining an electric correction signal;
    an analysis circuit configured to correct measurement data obtained by the measurement instrument based on the electric correction signal; and
    a divider circuit connected to the at least one sampling module downstream of the at least one sampling module, wherein the divider circuit is configured to divide the electric correction signal by two.

* * * * *